May 5, 1970     R. BAILEY     3,509,923

ROUTER GUIDE

Original Filed April 27, 1966

ROBERT BAILEY
INVENTOR.

BY R. E. Geauque
ATTORNEY

United States Patent Office 3,509,923
Patented May 5, 1970

3,509,923
ROUTER GUIDE
Robert Bailey, 15340 Mayall St.,
Mission Hills, Calif. 91340
Original application Apr. 27, 1966, Ser. No. 545,655.
Divided and this application July 10, 1968, Ser.
No. 743,651
Int. Cl. B27f 5/02
U.S. Cl. 144—136                           2 Claims

ABSTRACT OF THE DISCLOSURE

The sliding router guide has a guide opening which is dimensioned to closely receive the routing tool and confine the tool against movement relative to the guide. Routing movement of the tool along the work surface is accomplished by bodily sliding the guide along the surface.

---

This application is a division of U.S. application Ser. No. 545,655, filed Apr. 27, 1966.

This invention relates generally to woodworking devices and, more particularly, to a novel router guide.

In its broader aspects, the invention provides a router guide for use on a work piece having a work surface to be routed and a reference surface, disposed at right angles to and intersecting the work surface, relative to which the routed areas are to be located. The router guide includes a body which is adapted to seat against the work surface and is provided with a guide opening for receiving a routing tool and guiding the tool in its routing movement along the work surface. Disposed along one side of this body are lateral locating means which are engageable with the reference surface of the work piece to locate the guide opening relative to this surface, laterally of the work surface. In some cases, the router guide also may be equipped with longitudinal locating means for locating the guide opening along the work surface.

An illustrative embodiment of the invention is a sliding router guide having a guide opening which is dimensioned to closely receive the routing tool in such a way as to confine the tool against bodily movement relative to the guide. In this case, routing movement of the tool along the work surface is accomplished by bodily sliding the guide along the surface. This embodiment of the invention is particularly designed for rabbeting and mortising applications.

It is a general object of the present invention, therefore, to provide novel router guides of the character described.

A further object of the invention is to provide a sliding router guide for rabbeting and mortising applications.

Still a further object of the invention is to provide a router guide which is flexible, whereby it may be bent into an arcuate configuration conforming to a curved work surface.

Yet a further object of the invention is to provide router guides of the character described which are relatively simple in construction, economical to manufacture, lightweight, easy to use, yet rugged and durable, and are otherwise ideally suited to their intended purposes.

Other objects, advantages, and features of the invention will become readily evident as the description proceeds.

With these and such other objects in view, the invention consists in the construction, arrangement, and combination of the various parts of the invention, whereby the objects contemplated are obtained, as hereinafter set forth, pointed out in the appended claims, and illustrated in the accompanying drawings.

Figure 1:
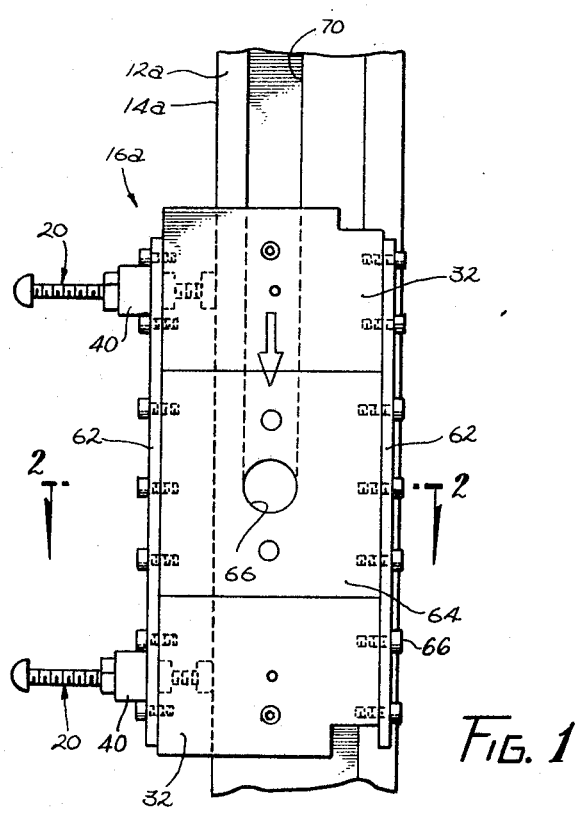
Figure 2:
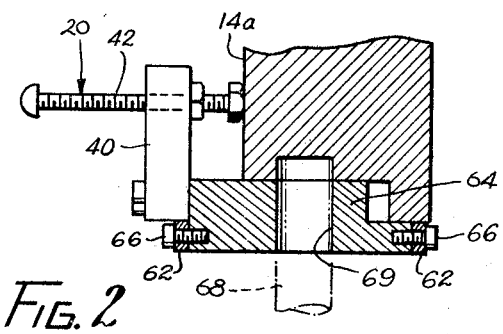

FIG. 1 illustrates a sliding router guide according to the invention for rabbeting and mortising applications; and FIG. 2 is a section taken on line 2—2 in FIG. 1.

As noted earlier, the present invention, in its broader aspects, provides a router guide for use on a work piece having a work surface to be routed and a reference surface normal to and intersecting the work surface.

Reference is now made to FIGS. 1 and 2 which illustrate a sliding router guide according to the invention which is useful in rabbeting and mortising applications. The router guide 16a comprises the two end guide blocks 32 of the router guide, the spacer bars 62 secured to the blocks by bolts 66, and an additional router guide block 64 which is placed between the blocks 32 and bolted to the spacer bars 62 as shown. Extending through the block 64 is an opening 66 to receive the bit 68 of a routing tool in the manner illustrated in FIG. 2. In use, the router guide is placed on the work surface 12a to be routed in such a manner that the locating screws 42, carried by arms 40 attached to the router guide blocks 32, engage a side reference surface 14a of the work piece. The routing tool bit 68 is then inserted through the guide opening 69 in such a way that the inner end of the bit penetrates the work surface 12a to the desired depth. Thereafter, the router guide 16a and the routing tool are bodily moved in unison along the work surface to rout a groove 70 in the surface. The spacing between this groove and the reference surface 14a of the work piece may be adjusted by adjusting the locating screws 42 of the router guide.

It is understood that the inserted block 64 can also serve to locate holes to be drilled while the router guide is stationary and that different shaped openings could be placed in a plurality of different blocks 64 to define router apertures for guiding a router tool when the router guide is stationary.

What is claimed as new in support of Letters Patent is:

1. A router guide for use on a work piece having a work surface to be routed and a reference surface intersecting said work surface;
  a body adapted to seat on said work surface and having a guide aperture for receiving a routing tool and guiding said tool in its movement along said work surface;
  said body comprising a pair of parallel spaced bars extending generally parallel to said work surface;
  a pair of blocks spaced along said bars;
  said blocks having seating surfaces disposed substantially in a common plane parallel to said bars and adapted for seating engagement with said work surface;
  means for securing said blocks to said bars;
  said pair of blocks and said bars defining therebetween an opening;
  removable aperture defining means insertable within said opening and rigidly secured to at least one of said bars for receiving and guiding said routing tool over said work surface; and lateral locating means carried by each of said blocks and disposed beyond said seating surfaces for engagement with said reference surface to locate said aperture relative to said reference surface.

2. A router guide as defined in claim 1 wherein said removable aperture defining means comprise a block snugly fitting within said opening and containing a round hole for receiving said routing tool.

References Cited

UNITED STATES PATENTS

| 1,506,154 | 8/1924 | Berthelsen. | |
|---|---|---|---|
| 2,990,861 | 7/1961 | Macks et al. | 144—136 |
| 3,087,520 | 4/1963 | Fielder | 144—136 |

DONALD R. SCHRAN, Primary Examiner

U.S. Cl. X.R.

144—27